(12) United States Patent
Turbeville et al.

(10) Patent No.: US 9,381,492 B2
(45) Date of Patent: Jul. 5, 2016

(54) COMPOSITION AND PROCESS FOR MERCURY REMOVAL

(71) Applicant: Sud-Chemie Inc., Louisville, KY (US)

(72) Inventors: Wayne Turbeville, Crestwood, KY (US); Greg Korynta, Louisville, KY (US); Todd Cole, Louisville, KY (US); Jeffery L. Braden, New Albany, IN (US)

(73) Assignee: Clariant Corporation, Louisville, KY (US)

( * ) Notice: Subject to any disclaimer, the term of this patent is extended or adjusted under 35 U.S.C. 154(b) by 180 days.

(21) Appl. No.: 13/691,977

(22) Filed: Dec. 3, 2012

(65) Prior Publication Data

US 2014/0155260 A1    Jun. 5, 2014

Related U.S. Application Data

(60) Provisional application No. 61/576,126, filed on Dec. 15, 2011.

(51) Int. Cl.

| | | |
|---|---|---|
| B01J 33/00 | (2006.01) |
| B01J 20/00 | (2006.01) |
| B01J 20/20 | (2006.01) |
| B01J 20/02 | (2006.01) |
| B01J 20/10 | (2006.01) |
| B01D 15/00 | (2006.01) |
| B01J 20/08 | (2006.01) |
| B01D 53/64 | (2006.01) |

(52) U.S. Cl.
CPC ............. *B01J 20/20* (2013.01); *B01D 15/00* (2013.01); *B01D 53/64* (2013.01); *B01J 20/0237* (2013.01); *B01J 20/0248* (2013.01); *B01J 20/0285* (2013.01); *B01J 20/08* (2013.01); *B01J 20/106* (2013.01); *B01D 2253/102* (2013.01); *B01D 2253/104* (2013.01); *B01D 2253/106* (2013.01); *B01D 2253/108* (2013.01); *B01D 2253/11* (2013.01); *B01D 2253/1128* (2013.01); *B01D 2255/104* (2013.01); *B01D 2255/106* (2013.01); *B01D 2255/20707* (2013.01); *B01D 2255/20715* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20792* (2013.01); *B01D 2256/245* (2013.01); *B01D 2257/602* (2013.01); *B01J 2220/42* (2013.01)

(58) Field of Classification Search
USPC ............ 423/210; 502/400, 1, 407, 411
See application file for complete search history.

(56) References Cited

U.S. PATENT DOCUMENTS

| | | | |
|---|---|---|---|
| 4,094,777 A | 6/1978 | Sugier et al. | |
| 4,474,896 A | 10/1984 | Chao | |
| 4,911,825 A * | 3/1990 | Roussel ................ C10G 45/04 |
| | | | 208/251 R |
| 5,409,522 A | 4/1995 | Durham et al. | |
| 5,505,766 A | 4/1996 | Chang | |
| 5,607,496 A | 3/1997 | Brooks | |
| 5,827,352 A | 10/1998 | Altman et al. | |
| 5,900,042 A | 5/1999 | Mendelsohn et al. | |
| 6,027,551 A | 2/2000 | Hwang et al. | |
| 6,136,281 A | 10/2000 | Meischen et al. | |
| 6,451,094 B1 | 9/2002 | Chang et al. | |
| 6,521,021 B1 | 2/2003 | Pennline et al. | |
| 6,699,440 B1 | 3/2004 | Vermeulen | |
| 6,719,828 B1 | 4/2004 | Lovell et al. | |
| 6,770,119 B2 | 8/2004 | Harada et al. | |
| 6,890,507 B2 | 5/2005 | Chen et al. | |
| 6,962,617 B2 | 11/2005 | Simpson | |
| 7,040,891 B1 | 5/2006 | Giuliani | |
| 7,081,434 B2 | 7/2006 | Sinha | |
| 7,238,223 B2 | 7/2007 | Meegan, Jr. | |
| 7,314,507 B1 | 1/2008 | Ganesan | |
| 7,413,719 B2 | 8/2008 | Digdon | |
| 7,468,170 B2 | 12/2008 | Comrie | |
| 7,517,511 B2 | 4/2009 | Schofield | |
| 7,618,603 B2 | 11/2009 | Seames et al. | |
| 7,704,920 B2 | 4/2010 | Yang et al. | |
| 7,766,997 B2 | 8/2010 | Lindau | |
| 7,776,294 B2 | 8/2010 | Hurley | |
| 7,776,297 B2 | 8/2010 | Cichanowicz | |
| 7,871,586 B2 | 1/2011 | Harada | |
| 7,887,618 B2 | 2/2011 | Nelson | |
| 7,928,033 B2 | 4/2011 | Akiyama | |
| 8,197,695 B2 | 6/2012 | Cousins et al. | |
| 8,277,542 B2 | 10/2012 | Srinivasachar | |

(Continued)

FOREIGN PATENT DOCUMENTS

| | | |
|---|---|---|
| DE | 19717798 | 10/1998 |
| DE | 19828593 | 10/1999 |

(Continued)

*Primary Examiner* — James McDonough

(57) ABSTRACT

A process for removing mercury from a gas or liquid phase, wherein the gas or liquid phase containing mercury is placed in contact with a composition comprising a precipitated metal sulfide. The precipitated metal sulfide may be made by the process of combining a metal source, sulfide source, and modifier to form the precipitated metal sulfide. The metal source may comprise iron, cobalt, nickel, copper, zinc, zirconium, molybdenum, silver, or gold salts. The metal salt may be selected from metal nitrate, metal sulfate, metal phosphate, metal acetate, metal carbonate, metal hydroxide, metal ammonium carbonate, and metal hydroxycarbonate. The sulfide source is selected from hydrogen sulfide ($H_2S$), carbonyl sulfide (COS), salts of sulfide ($S^{2-}$), salts of hydrosulfide ($HS^-$), and salts of polysulfide ($S_n^{2-}$). The modifier may be selected from alumina, silica, aluminosilicate, clay, zeolites, carbon, cement, titania, zirconia.

13 Claims, No Drawings

(56) References Cited

U.S. PATENT DOCUMENTS

| | | |
|---|---|---|
| 8,328,908 B2 | 12/2012 | Snape et al. |
| 2003/0206843 A1 | 11/2003 | Nelson, Jr. |
| 2004/0180788 A1 | 9/2004 | Khalili |
| 2005/0108925 A1 | 5/2005 | Jurng |
| 2005/0260112 A1 | 11/2005 | Hensman |
| 2006/0051270 A1 | 3/2006 | Brunette |
| 2006/0120935 A1 | 6/2006 | Stuhler |
| 2006/0205591 A1 | 9/2006 | Lee |
| 2007/0092419 A1 | 4/2007 | Fan et al. |
| 2007/0122327 A1* | 5/2007 | Yang ............... B01D 53/02 423/210 |
| 2008/0279739 A1* | 11/2008 | Cross ............... B01D 53/02 423/235 |
| 2008/0305021 A1 | 12/2008 | Sinha |
| 2008/0307960 A1 | 12/2008 | Hendrickson |
| 2009/0280046 A1 | 11/2009 | Reddy et al. |
| 2010/0050868 A1 | 3/2010 | Kuznicki et al. |
| 2013/0053234 A1 | 2/2013 | Fish et al. |

FOREIGN PATENT DOCUMENTS

| | | |
|---|---|---|
| JP | 56067527 | 6/1981 |
| JP | 63100918 | 5/1988 |
| WO | 0062906 | 10/2000 |

\* cited by examiner

COMPOSITION AND PROCESS FOR MERCURY REMOVAL

CROSS REFERENCE TO RELATED APPLICATIONS

The present application hereby claims the benefit of the provisional patent application of the same title, Ser. No. 61/576,126, filed on Dec. 15, 2011, the disclosure of which is incorporated by reference herein in its entirety.

BACKGROUND

Metal sulfides are commonly used to scrub mercury from gases and liquids, such as for refinery generated natural gas streams. A common way to produce copper sulfide is to react copper oxide with a gaseous sulfide, such as hydrogen sulfide or carbonyl sulfide.

BRIEF SUMMARY

A process for removing mercury from a gas or liquid phase, wherein the gas or liquid phase containing mercury is placed in contact with a composition comprising a precipitated metal sulfide.

A composition comprising a precipitated copper sulfide made by the process of combining a copper source, sulfide source, and modifier to form the precipitated copper sulfide. The copper source is selected from copper nitrate, copper sulfate, copper phosphate, copper acetate, copper carbonate, copper hydroxide, copper ammonium carbonate, and copper hydroxycarbonate. The sulfide source is selected from hydrogen sulfide ($H_2S$), carbonyl sulfide (COS), salts of sulfide ($S^{2-}$), salts of hydrosulfide ($HS^-$), and salts of polysulfide ($S_n^{2-}$). The cations of the salts are selected from sodium, potassium, rubidium, cesium, beryllium, magnesium, calcium, strontium, barium, and ammonium. The modifier is selected from alumina, silica, aluminosilicate, clay, zeolites, carbon, cement, titania, and zirconia.

These and other objects and advantages shall be made apparent from the description.

DETAILED DESCRIPTION

Preparation of copper sulfide by as phase sulfidation of copper oxide involves precipitation of copper with a base, such as hydroxide, carbonate, bicarbonate, or ammonium. The copper formed is usually copper hydroxide or copper hydroxycarbonate, which must be decomposed by high temperature calcination. A metal sulfide may be prepared in an alternative procedure of precipitation. The precipitate is formed from a transition metal source and a sulfide source. Despite both products containing a metal and sulfur, the precipitated metal sulfide has been found to absorb mercury better than metal sulfides produced by other means.

The nature of the metal sulfide formed by precipitation is believed to have a different morphology of the metal sulfide compared to metal sulfides formed by other procedures, such as by calcination followed by sulfur treatment or a metal salt already absorbed onto a support. As a precipitate it may have more sites for adsorption of mercury, greater surface area, or cavities that have enhanced reactivity. The method of precipitation is typically performed in water, but it may be an alcohol or other liquid, or it may be a mixture of liquids. In one embodiment, both the transition metal source and the sulfide source are soluble in the liquid. However, it is not necessary that both the transition metal source and the sulfide source be soluble. In another embodiment, the transition metal source is not soluble and the sulfide source is soluble in the liquid. In another embodiment, the transition metal source is soluble and the sulfide source is not soluble in the liquid. The transition metal source or the sulfide source need not be very soluble in water, sparingly soluble is sufficient.

The precipitation involves a reaction between the transition metal source and the sulfide source so a metal sulfide is formed. The resulting metal sulfide forms a precipitate in the liquid. Without being bound by theory, it is believed that the precipitation does not involve the reduction or oxidation of the transition metal source or the sulfide source. Prior to precipitation, it is not necessary for the transition metal to be bonded to a support or other material.

Metal sulfides may exist in many forms. The metal and the sulfur may have different oxidation states. These different forms will have different chemical properties. The precipitated metal sulfide is believed to be a metal sulfide where the formal oxidation state of the sulfur is −2. The sulfide is not believed to be a polysulfide, it is believed to be metal monosulfide or comprise metal monosulfide. In one embodiment, the precipitated metal sulfide is copper monosulfide.

The metal sulfide will adsorb mercury from a gas or liquid. The method of adsorption may be by physical adsorption, chemisorption, or a combination of the two.

In one embodiment, a process removes mercury from a gas or liquid phase. The gas or liquid phase containing mercury is placed in contact with a precipitated metal sulfide. In another embodiment, the precipitated metal sulfide is selected from a transition metal sulfide. In another embodiment, the precipitated metal sulfide is selected from iron sulfide, cobalt sulfide, nickel sulfide, copper sulfide, zinc sulfide, zirconium sulfide, molybdenum sulfide, silver sulfide, and gold sulfide. In another embodiment, the metal sulfide comprises copper sulfide.

The metal sulfide is precipitated from a metal source comprising iron, cobalt, nickel, copper, zinc, zirconium, molybdenum, silver, or gold salts. In one embodiment, the metal salt may be selected from metal nitrate, metal sulfate, metal phosphate, metal acetate, metal carbonate, metal hydroxide, metal ammonium carbonate, and metal hydroxycarbonate. In one embodiment, the metal source comprises $Cu^{2+}$. In one embodiment, the metal source comprises $Cu^{2+}$ and is selected from copper nitrate, copper sulfate, copper phosphate, copper acetate, copper carbonate, copper hydroxide, copper ammonium carbonate, and copper hydroxycarbonate. The metal source may be a mixture of copper compounds.

The precipitated copper sulfide is formed from a sulfide source. In one embodiment, the sulfide source is selected from hydrogen sulfide ($H_2S$), carbonyl sulfide (COS), salts of sulfide ($S^{2-}$), salts of hydrosulfide ($HS^-$), and salts of polysulfide ($S_n^{2-}$). The cations of the salts are selected from sodium, potassium, rubidium, cesium, beryllium, magnesium, calcium, strontium, barium, and ammonium. In one embodiment, the sulfide source is selected from hydrogen sulfide, sodium sulfide, sodium hydrosulfide, potassium sulfide, potassium hydrosulfide, rubidium sulfide, cesium sulfide, beryllium sulfide, magnesium sulfide, calcium sulfide, strontium sulfide, barium sulfide, and ammonium sulfide. In another embodiment, the sulfide source is selected from hydrogen sulfide, sodium sulfide, sodium hydrosulfide, potassium sulfide, potassium hydrosulfide, potassium sulfide, magnesium sulfide, calcium sulfide, and strontium sulfide. In another embodiment, the sulfide source is selected from sulfide, sodium sulfide, sodium hydrosulfide potassium sulfide, potassium hydrosulfide, potassium sulfide, magnesium sulfide, and calcium sulfide. The sulfide source may be a single compound or it may be a mixture of sulfides.

In one embodiment, the precipitated metal sulfide is formed in the presence of a modifier. The modifier may be selected from alumina (including trihydroxides, transitional aluminas, amorphous, and alpha), silica (including fumed, precipitated, amorphous, silicates, and natural forms, such as perlite), aluminosilicate, clay (which includes montmorillinite, hydrotalcite, attapulgite), zeolites, carbon (including activated carbon), cement, titania, and zirconia. The modifier may comprise more than one modifier. A modifier may be a structural modifier which provides structure and strength for an extruded precipitated metal sulfide. A modifier may be a dispersant modifier which increases the surface area of the precipitated metal sulfide. An increase in surface area for the precipitated metal sulfide will increase the rate of adsorption of mercury. In one embodiment, the modifier is selected from alumina, zeolites, silica, and activated carbon. In another embodiment, the modifier is selected from silica. In another embodiment, the modifier is selected from alumina. The precipitated metal sulfide may be precipitated copper sulfide.

In one embodiment, the composition comprises more than one modifier. The modifiers may be more than one structural modifier, more than one dispersant modifier, or at least one structural and at least one dispersant modifier. Examples of structural modifiers include alumina, silica, aluminosilicate, clay, zeolites, cement, titania, and zirconia. Examples of dispersant modifiers include alumina, silica, aluminosilicate, clay, zeolites, carbon, cement, titania, and zirconia. In one embodiment, the structural modifier is alumina, and the dispersant modifier is selected from perlite and activated carbon. In another embodiment, the structural modifier is alumina, and the dispersant modifier is perlite. The precipitated metal sulfide may be precipitated copper sulfide.

The amount of precipitated metal sulfide in the composition may range from about 1% to about 100%. The amount of precipitated metal sulfide in the composition may range from about 5% to about 100%, about 10% to about 90%, about 20% to about 90%, about 30% to about 90%, about 40% to about 90%, about 50% to about 90%, about 60% to about 90%, about 70% to about 90%, about 80% to about 90%, or about 80% by weight. The amount of precipitated metal sulfide in the composition may range from about 10% to about 80%, about 10% to about 70%, about 10% to about 60%, about 10% to about 50%, about 1.0% to about 40%, about 10% to about 30%, about 10% to about 20%, or about 20% by weight. The amount of modifier may be the remainder of the weight of the composition, or it may be less than the remainder of the weight of the composition. It may be about 90% to about 10%, about 80% to about 20%, about 70% to about 30%, about 60% to about 40%, or about 50% of the remainder of the weight of the composition.

In one embodiment, the composition comprises about 80% precipitated metal sulfide, about 10% structural modifier, and about 10% dispersant modifier. In another embodiment, the composition comprises about 80% precipitated metal sulfide and about 20% structural modifier. In another embodiment, the composition comprises about 80% precipitated metal sulfide, about 20% dispersant modifier.

In one embodiment, the composition comprises about 20% precipitated metal sulfide, about 40% structural modifier, and about 40% dispersant modifier. In another embodiment, the composition comprises about 10% precipitated metal sulfide and about 90% structural modifier. In another embodiment, the composition comprises about 10% precipitated metal sulfide, about 90% dispersant modifier. In another embodiment, the composition comprises about 20% precipitated metal sulfide, about 80% dispersant modifier.

The precipitated metal sulfide may be filtered from the mother liquor and dried to form a powder. After the filtration, the metal sulfide, such as copper sulfide, may be formed into a paste, then extruded to form an extruded shape such as a cylinder, tablet, ring, pellet, and sphere, followed by drying. In addition the shapes may be formed so as to increase their surface area. They may be ribbed, lobed, smooth, or have holes. Extrusion may be through a screw extruder. In one embodiment, the precipitated copper sulfide is extruded and dried prior to contacting the gas or liquid phase containing mercury. The precipitated metal sulfide may be tableted or pelletized from the powder. The powder may optionally be ground to form a fine powder.

The precipitated metal sulfide may be a mixture of precipitated metal sulfides or it may be a single precipitated metal sulfide. In one embodiment, the precipitated metal sulfide additionally comprises at least one other precipitated metal sulfide wherein the metal is selected from zirconium, magnesium, calcium, strontium, barium, chromium, manganese, cobalt, iron, molybdenum, nickel, zinc, titanium, tungsten, lanthanum, cerium, and silver. The precipitated metal sulfide may be copper sulfide. In one embodiment, the precipitated copper sulfide additionally comprises zinc sulfide. When there is more than one precipitated metal sulfide, they may be co-precipitated or one may be precipitated before the other is precipitated.

The performance of the precipitated metal sulfide may be measured in several ways. One method is mercury capacity, which is the mass of mercury that can be adsorbed per mass of adsorber before a certain level of mercury passes through the adsorber (breakthrough). A simple test procedure is shown in the Examples. In one embodiment, an extruded precipitated metal sulfide has a mercury capacity of about 8,800 µg-Hg/g-A or more prior to 1% breakthrough. Where µg-Hg/g-A is µg of mercury absorbed per gram of absorber. In another embodiment, an extruded precipitated metal sulfide has a mercury capacity of about 13,000 µg-Hg/g-A or more prior to 1% breakthrough. In another embodiment, an extruded precipitated metal sulfide has a mercury capacity of about 40,000 µg-Hg/g-A or more prior to 1% breakthrough.

In one embodiment, the process for removing mercury is conducted in a fluidized bed reactor. The fluidized bed reactor allows fluids such as gas or liquid to pass through a fluidized solid material. The composition comprising the precipitated metal sulfide is part of the solid material. At the minimum fluidizing velocity of the gas or liquid, the solid material rises off the distributor and mixes with the gas or liquid (is fluidized). A person of ordinary skill in the art is knowledgeable about how to operate a fluidized bed.

In one embodiment, the process for removing mercury is conducted in a fixed bed. The gas or liquid containing mercury is passed through a vessel containing the composition comprising the precipitated metal sulfide. The amount and packing of the composition may be adjusted to prevent a large pressure drop across the fixed bed. For a fixed bed process, the amount of metal sulfide in the composition may be about 60% to about 90%, about 70% to about 80%, or about 80%; with the remainder being modifier.

In one embodiment, mercury from flue gas. Flue gas, such as exhaust gas from coal power plants may contain mercury. The amount of mercury in the flue gas may be reduced by injecting or blowing the powdered composition comprising the precipitated metal sulfide into the gas. The powder is removed from the gas after it has reduced the mercury content. For a flue gas process, the amount of metal sulfide in the composition may be about 10% to about 40%, about 20% to about 30%, or about 20%; with the remainder being modifier.

For a flue gas process the density of the composition may be adjusted so that the composition comprising the precipitated metal sulfide is fluidized in the flue gas. When the composition is fluidized it remains suspended in the flue gas. This allows the composition to remain in contact with the flue gas until it is removed. The density of the composition may be about 0.6 g/mL. In another embodiment, the composition may have a density of about 0.1 g/mL to about 0.9 g/mL, about 0.2 g/mL to about 0.8 g/mL, about 0.5 g/mL to about 0.8 g/mL, about 0.4 g/mL to about 0.5 gird, about 0.1 g/mL to about 0.3 g/mL, about 0.1 g/mL to about 0.2 g/mL, or about 0.4 g/mL to about 0.6 g/mL. The density is measured when the composition has been tamped down.

In one embodiment, a composition comprises precipitated copper sulfide made by the process of combining a copper source, sulfide source, and modifier to form the precipitated copper sulfide. The copper source is selected from copper nitrate, copper sulfate, copper phosphate, copper acetate, copper carbonate, copper hydroxide, copper ammonium carbonate, and copper hydroxycarbonate. The sulfide source is selected from hydrogen sulfide ($H_2S$), carbonyl sulfide (COS), salts of sulfide ($S^{2-}$), salts of hydrosulfide ($HS^-$), and salts of polysulfide ($S_n^{2-}$). The cations of the salts are selected from sodium, potassium, rubidium, cesium, beryllium, magnesium, calcium, strontium, barium, and ammonium. The modifier may be selected from alumina (including trihydroxides, transitional aluminas, amorphous, and alpha), silica (including fumed, precipitated, amorphous, silicates, and natural forms, such as perlite), aluminosilicate, clay (which includes montmorillinite, hydrotalcite, attapulgite), zeolites, carbon (including activated carbon), cement, titania, and zirconia.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

A sample of 19.60 g copper nitrate crystals was added to 500 mL water and dissolved. This solution was then stirred and heated to 60° C. To this solution strontium sulfide powder (6.70 g) was slowly added. The resulting slurry was aged for 1 hr then filtered, washed, and dried at 110° C. for 2 hrs.

Example 2

A sample of 6.70 g sodium sulfide hydrate crystals was added to 500 mL water and dissolved. This solution was then stirred and heated to 60° C. To this solution copper acetate powder (10.45 g) was slowly added. The resulting slurry was aged for 1 hr then filtered, washed, and dried at 110° C. for 2 hrs.

Example 3

Comparative Example

A commercial sample of Süd-Chemie C18-5 copper catalyst (nominally 42% CuO, 47% ZnO, and balance $Al_2O_3$), was sulfur treated under the conditions of: 50 psi, at 50° C., with 10,000 GHSV using 150 ppm $H_2S$ and 2,500 ppm $H_2O$ in methane. The treatment was allowed to run until the catalyst was saturated.

Example 4

A sample of 264.8 g of sodium sulfide hydrate crystals was added to 1.5 L water and dissolved. This solution was stirred and 415.90 g copper acetate powder was slowly added. The resulting slurry was aged for 1 hr then filtered, washed, and dried at 110° C. for 2 hrs. 50.5 g ground cake was mixed with 25.2 g water and formed in to ⅛ inch extrudates.

Example 5

A sample of 59.39 g copper carbonate basic and 12.50 g of alumina powder were added to 500 mL water and stirred. A sample of 66.66 g sodium sulfide hydrate crystals was added to 200 mL water and dissolved. This solution was then slowly added to the initial carbonate and alumina slurry. The resulting slurry was aged for 3 hrs then filtered, washed, and dried at 110° C. for 2 hours. 54.80 g ground cake was mixed with 23.63 g water and formed into ⅛ inch extrudates.

Example 6

A sample of 59.34 g copper carbonate basic, 6.25 g alumina powder, and 6.30 g of activated carbon powder were added to 500 mL water and stirred. A sample of 63.51 g sodium sulfide hydrate crystals was added to 200 mL water and dissolved. This solution was then slowly added to the initial slurry. The resulting slurry was aged for 1 hr then filtered, washed, and dried at 110° C. for 2 hrs. 60.51 g ground cake was mixed with 33.90 g water and formed into ⅛ inch extrudates.

Example 7

A sample of 59.36 g copper carbonate basic, 6.25 g of alumina powder, and 6.28 g of perlite were added to 500 mL water and stirred. A sample of 71.55 g sodium hydrogen sulfide solution was then slowly added to the initial slurry. The resulting slurry was aged for 1 hr and then filtered, washed, and dried at 110° C. for 2 hours. 55.00 g ground cake was mixed with 22.0 g water and formed into ⅛ inch extrudates.

Example 8

Test Procedure

A lab-scale mercury vapor test unit was utilized for the evaluation of the long-term adsorbent performance. The feedstock was mercury vapor generated by bubbling nitrogen through a temperature controlled mercury evaporation cell. Nitrogen flow (1.5-2.0 L/min) through the cell generated a mercury vapor stream at a concentration of 1,200 to 2,500 μg/m³ mercury. It could be diluted with separate nitrogen flow (0-2.0 L/min) to control the final mercury concentration.

Adsorbent samples were loaded as either a −60 mesh powder or 16-20 mesh granules into a 6-mm temperature-controlled column. Mercury vapor was then passed through the column for adsorption at different gas hour state velocity (GHSV). Column pressure was maintained at 6 bar to allow a mass flow controller to divert a gas slipstream into a mercury vapor monitor (Mercury Instruments Model VM-3000) for mercury analysis and the data was stored in a computer through RS-232 connection every 1 to 5 minutes. The mercury capacity of each sample is tabulated based on when 1% and 10% breakthrough or mercury occurred.

TABLE 1

Powder Testing - Mercury Capacity (μg-Hg/g-A)
(~60 mesh, 30° C., 500,000 GHSV)

| Sample | <1% Breakthrough | <10% Breakthrough |
|---|---|---|
| Example 1 | 10,000 | 228,000 |
| Example 2 | 546,000 | 590,000 |

TABLE 2

Extrusion Testing - Mercury Capacity (μg-Hg/g-A)
(16-20 mesh, 30° C., 100,000 GHSV)

| Sample | <1% Breakthrough | <10% Breakthrough |
|---|---|---|
| Example 3 | 7,000 | 27,900 |
| Example 4 | 8,880 | 51,900 |
| Example 5 | 13,800 | 35,800 |
| Example 6 | 40,700 | 93,100* |
| Example 7 | 83,000 | 140,000* |

*Based on extrapolation as the sample was not allowed to reach 10% breakthrough.

Example 9

20% CuS on Perlite, Via Na$_2$S

A sample of 11.90 g copper carbonate basic was added to 250 mL water and stirred. A sample of 13.50 g sodium sulfide hydrate crystals was added to 400 mL water and dissolved. The two solutions were precipitated with 40.0 g of perlite. The resulting slurry was aged for 1 hr and then filtered, washed, and dried at 110° C. for 4 hours. The sample was tested as in Example 8, but at –40 mesh, 30° C., 100,000 GHSV.

Example 10

20% CuS on Carbon, Via Na$_2$S

A sample of 11.87 g copper carbonate basic and 40.00 g of carbon were added to 500 mL water and stirred. A sample of 13.30 g sodium sulfide hydrate crystals was added to 100 mL water and dissolved. This solution was then slowly added to the initial carbonate and carbon slurry. The resulting slurry was aged for 1 hr and then filtered, washed, and dried at 110° C. for 2 hours. The sample was tested as in Example 8, but at –40 mesh, 30° C., 100,000 GHSV.

Example 11

20% CuS on Perlite, Via NaHS

A sample of 11.87 g copper carbonate basic was added to 250 mL water and stirred. A sample of 14.43 g sodium hydrogen sulfide solution was diluted to 400 mL water. The two solutions were precipitated with 40.0 g of perlite. The resulting slurry was aged for 1 hr and then filtered, washed, and dried at 110° C. for 4 hours. The sample was tested as in Example 8, but at –40 mesh, 30° C., 100,000 GHSV.

Example 12

20% CuS on Perlite, Via NaHS

A sample of 11.87 g copper carbonate basic was added to 250 mL water and stirred. A sample of 14.43 g sodium hydrogen sulfide solution was diluted to 400 mL water. The two solutions were precipitated with 40.0 g of perlite. The resulting slurry was aged for 1 hr and then filtered and washed. The material was initially partially dried at 40° C. for 1 hour, and then completely dried at 150° C. for 5 hours. The sample was tested as in Example 8, but at –40 mesh, 30° C., 100,000 GHSV.

TABLE 3

Powder Testing* - Mercury Capacity (μg-Hg/g-A)
(–40 mesh, 30° C., 100,000 GHSV)

| Sample | <10% Breakthrough | Density, g/cc |
|---|---|---|
| Example 9 | 6,730 | 0.14 |
| Example 10 | 14,600 | 0.52 |
| Example 11 | 65,900 | 0.18 |
| Example 12 | 74,700 | 0.21 |

What is claimed is:

1. A process for removing mercury from a gas or liquid phase, wherein a gas or liquid phase containing mercury is placed in contact with a composition comprising a precipitated metal sulfide, wherein the composition is formed in the presence of a modifier comprising perlite, wherein the precipitated metal sulfide comprises copper sulfide made from a copper source and salts of hydrosulfide (HS$^-$).

2. The process of claim 1, wherein the precipitated metal sulfide additionally comprises a metal selected from iron, cobalt, nickel, zinc, zirconium, molybdenum, silver, and gold.

3. The process of claim 1, wherein the precipitated copper sulfide is formed from a metal salt selected from copper nitrate, copper sulfate, copper phosphate, copper acetate, copper carbonate, copper hydroxide, copper ammonium carbonate, and copper hydroxycarbonate.

4. The process of claim 1, wherein the modifier additionally comprises alumina, silica, aluminosilicate, clay, zeolites, carbon, cement, titania, and zirconia.

5. The process of claim 4, wherein the modifier additionally comprises alumina.

6. The process of claim 4, wherein the modifier additionally comprises activated carbon.

7. The process of claim 4, wherein the composition is extruded and dried prior to contacting the gas or liquid phase containing mercury.

8. The process of claim 7, wherein the extruded composition has a mercury adsorption capacity of about 13,000 μg-Hg/g-A or more.

9. The process of claim 7, wherein the extruded composition has a mercury adsorption capacity of about 40,700 μg-Hg/g-A or more.

10. The process of claim 2, wherein the composition is a powder.

11. The process of claim 2, wherein the composition is extruded and dried prior to contacting the gas or liquid phase containing mercury.

12. The process of claim 4, wherein the composition comprises about 20% to about 80% precipitated copper sulfide, and about 20% to about 80% modifier.

13. The process of claim 1, wherein the salts of hydrosulfide ($HS^-$) comprise sodium hydrogen sulfide.

* * * * *